(12) United States Patent
Cooper et al.

(10) Patent No.: US 12,698,674 B2
(45) Date of Patent: *Aug. 4, 2026

(54) DYNAMIC SHADE WITH REACTIVE GAS COMPATIBLE DESICCANT, AND/OR ASSOCIATED METHODS

(71) Applicant: GUARDIAN GLASS, LLC, Auburn Hills, MI (US)

(72) Inventors: David J. Cooper, Auburn Hills, MI (US); Duane O. Recker, Auburn Hills, MI (US); John Matuszewski, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 1260 days.

This patent is subject to a terminal disclaimer.

(21) Appl. No.: 17/375,262

(22) Filed: Jul. 14, 2021

(65) Prior Publication Data

US 2022/0018179 A1 Jan. 20, 2022

Related U.S. Application Data

(60) Provisional application No. 62/705,776, filed on Jul. 15, 2020.

(51) Int. Cl.
*E06B 3/67* (2006.01)
*B01J 20/04* (2006.01)
(Continued)

(52) U.S. Cl.
CPC .............. *E06B 3/677* (2013.01); *B01J 20/046* (2013.01); *B01J 20/28026* (2013.01);
(Continued)

(58) Field of Classification Search
CPC . E06B 9/264; E06B 3/66; E06B 3/663; E06B 3/66328; E06B 3/66361;
(Continued)

(56) References Cited

U.S. PATENT DOCUMENTS 5,351,451 A * 10/1994 Misera ................ E06B 3/67304
52/658
5,447,761 A * 9/1995 Lafond ............... E06B 3/66328
52/786.13

(Continued)

FOREIGN PATENT DOCUMENTS

CN 205713780 U 11/2016
CN 210067931 U 2/2020
(Continued)

OTHER PUBLICATIONS

Cornella et al, Activation and Catalytic Degradation of SF6 and PhSF5 at a Bismuth Center, JACS, 2024, 146,25409-25415.*
(Continued)

*Primary Examiner* — Z. Jim Yang
(74) *Attorney, Agent, or Firm* — Baker Botts L.L.P.

(57) ABSTRACT

Certain example embodiments relate to electric, potentially-driven shades usable with insulating glass (IG) units, IG units including such shades, and/or associated methods. In such a unit, a dynamic shade is located between the substrates defining the IG unit, and is movable between retracted and extended positions. The dynamic shade includes on-glass layers including a transparent conductor and an insulator or dielectric film, as well as a shutter. The shutter includes a resilient polymer-based layer and layers on opposing surfaces thereof. A first voltage is applied to the transparent conductors to cause the shutter to extend to a closed position.

12 Claims, 3 Drawing Sheets

(51) Int. Cl.
| | | |
|---|---|---|
| *B01J 20/28* | (2006.01) | |
| *B32B 7/12* | (2006.01) | |
| *B32B 17/10* | (2006.01) | |
| *E06B 3/663* | (2006.01) | |
| *E06B 3/677* | (2006.01) | |
| *E06B 9/24* | (2006.01) | |

(52) U.S. Cl.
CPC .......... *B32B 7/12* (2013.01); *B32B 17/10018* (2013.01); *B32B 17/10779* (2013.01); *E06B 3/66361* (2013.01); *E06B 9/24* (2013.01); *B32B 2255/10* (2013.01); *B32B 2255/20* (2013.01); *B32B 2307/202* (2013.01); *B32B 2307/204* (2013.01); *B32B 2419/00* (2013.01); *B32B 2509/10* (2013.01); *B32B 2605/006* (2013.01); *E06B 2009/2464* (2013.01)

(58) Field of Classification Search
CPC ........ E06B 3/67; H10K 50/846; B01D 52/26; B01D 52/261; B01D 52/28; B01J 20/046
See application file for complete search history.

(56) References Cited

U.S. PATENT DOCUMENTS

| | | | | |
|---|---|---|---|---|
| 5,806,272 | A * | 9/1998 | Lafond | E06B 3/66328 52/786.13 |
| 5,863,857 | A * | 1/1999 | Lamb | C08L 23/10 156/107 |
| 6,528,131 | B1 * | 3/2003 | Lafond | E06B 3/66328 52/786.13 |
| 6,887,575 | B2 | 5/2005 | Neuman | |
| 7,056,588 | B2 | 6/2006 | Neuman | |
| 7,189,458 | B2 | 3/2007 | Ferreira | |
| 7,198,851 | B2 | 4/2007 | Lemmer | |
| 7,645,977 | B2 | 1/2010 | Schlam | |
| 7,705,826 | B2 | 4/2010 | Kalt | |
| 7,771,830 | B2 | 8/2010 | Neuman | |
| 7,998,320 | B2 | 8/2011 | Laird | |
| 8,035,075 | B2 | 10/2011 | Schlam | |
| 8,134,112 | B2 | 3/2012 | Schlam | |
| 8,557,391 | B2 | 10/2013 | Lemmer | |
| 8,668,990 | B2 | 3/2014 | Broadway | |
| 8,736,938 | B1 | 5/2014 | Schlam | |
| 8,795,568 | B2 | 8/2014 | Trpkovski | |
| 8,967,219 | B2 | 3/2015 | Nieminen et al. | |
| 8,982,441 | B2 | 3/2015 | Schlam | |
| 9,187,949 | B2 | 11/2015 | Trpkovski et al. | |
| 9,309,714 | B2 | 4/2016 | Nieminen et al. | |
| 9,556,066 | B2 | 1/2017 | Frank | |
| 9,617,781 | B2 | 4/2017 | Trpkovski | |
| 9,656,356 | B2 | 5/2017 | Pemberton | |
| 9,670,092 | B2 | 6/2017 | Lemmer | |
| 9,689,196 | B2 | 6/2017 | Pemberton et al. | |
| 9,695,085 | B2 | 7/2017 | Lemmer | |
| 9,796,619 | B2 | 10/2017 | Broadway | |
| 9,802,860 | B2 | 10/2017 | Frank | |
| 10,233,690 | B2 | 3/2019 | Nieminen et al. | |
| 10,876,349 | B2 | 12/2020 | Blush et al. | |
| 2002/0014305 | A1 * | 2/2002 | Dick | B01J 20/0244 156/308.4 |
| 2004/0238788 | A1 * | 12/2004 | Hoglund | B01J 20/183 252/194 |
| 2004/0258859 | A1 * | 12/2004 | Acevedo | E06B 3/677 428/34 |
| 2005/0107243 | A1 * | 5/2005 | Kilthau | B01J 20/30 252/194 |
| 2006/0013979 | A1 * | 1/2006 | Ensinger | B01J 20/18 428/188 |
| 2007/0177391 | A1 | 8/2007 | Davis et al. | |
| 2009/0069170 | A1 * | 3/2009 | Wang | C09J 123/14 502/402 |
| 2012/0009404 | A1 | 1/2012 | Hes et al. | |
| 2012/0094040 | A1 | 4/2012 | Mader | |
| 2012/0137608 | A1 * | 6/2012 | Plant | E06B 3/66314 52/204.593 |
| 2012/0264600 | A1 * | 10/2012 | Tso | B01J 20/3234 62/476 |
| 2014/0113098 | A1 | 4/2014 | Rapp et al. | |
| 2014/0117335 | A1 * | 5/2014 | Moon | H10K 50/8426 257/40 |
| 2014/0268296 | A1 * | 9/2014 | Schlam | E06B 3/00 359/290 |
| 2014/0272314 | A1 | 9/2014 | Veerasamy | |
| 2015/0345208 | A1 * | 12/2015 | Boulanger | E06B 3/66357 428/34 |
| 2016/0138326 | A1 * | 5/2016 | Kuster | E06B 3/66366 52/204.595 |
| 2017/0155086 | A1 * | 6/2017 | Kang | H10K 59/873 |
| 2020/0011120 | A1 | 1/2020 | Blush et al. | |
| 2020/0039725 | A1 * | 2/2020 | Parsons | B65D 81/24 |
| 2021/0238913 | A1 | 8/2021 | Koskulics | |

FOREIGN PATENT DOCUMENTS

| | | | | |
|---|---|---|---|---|
| EP | 1059414 | A2 * | 12/2000 | ........ E06B 3/66328 |
| JP | S58134425 | A | 8/1983 | |
| JP | S58135420 | A | 8/1983 | |
| JP | S6045347 | U | 3/1985 | |
| JP | S6045349 | U | 3/1985 | |
| JP | S63252946 | A | 10/1988 | |
| JP | H11510227 | A | 9/1999 | |
| JP | 2005500155 | A | 1/2005 | |
| JP | 2010084440 | A | 4/2010 | |
| JP | 2011503403 | A | 1/2011 | |
| JP | 2016508944 | A | 3/2016 | |
| JP | 2016526622 | A | 9/2016 | |
| JP | 2020050578 | A | 4/2020 | |
| WO | WO-2022139274 | A1 * | 6/2022 | .......... B01D 53/261 |

OTHER PUBLICATIONS

Pub chem entry on SF6, https://pubchem.ncbi.nlm.nih.gov/compound/Sulfur-Hexafluoride.*

Definition of zeolite, from British Zeolite Society; www.britishzeolite.org/zeolites.*

Machine translation of WO 2022/139274 A1, obtained from EspaceNet.*

U.S. Appl. No. 17/232,406, filed Apr. 16, 2021, 40 Pages.

International Search Report and Written Opinion received for PCT Application No. PCT/IB2021/056360, mailed on Nov. 17, 2021, 13 Pages.

* cited by examiner

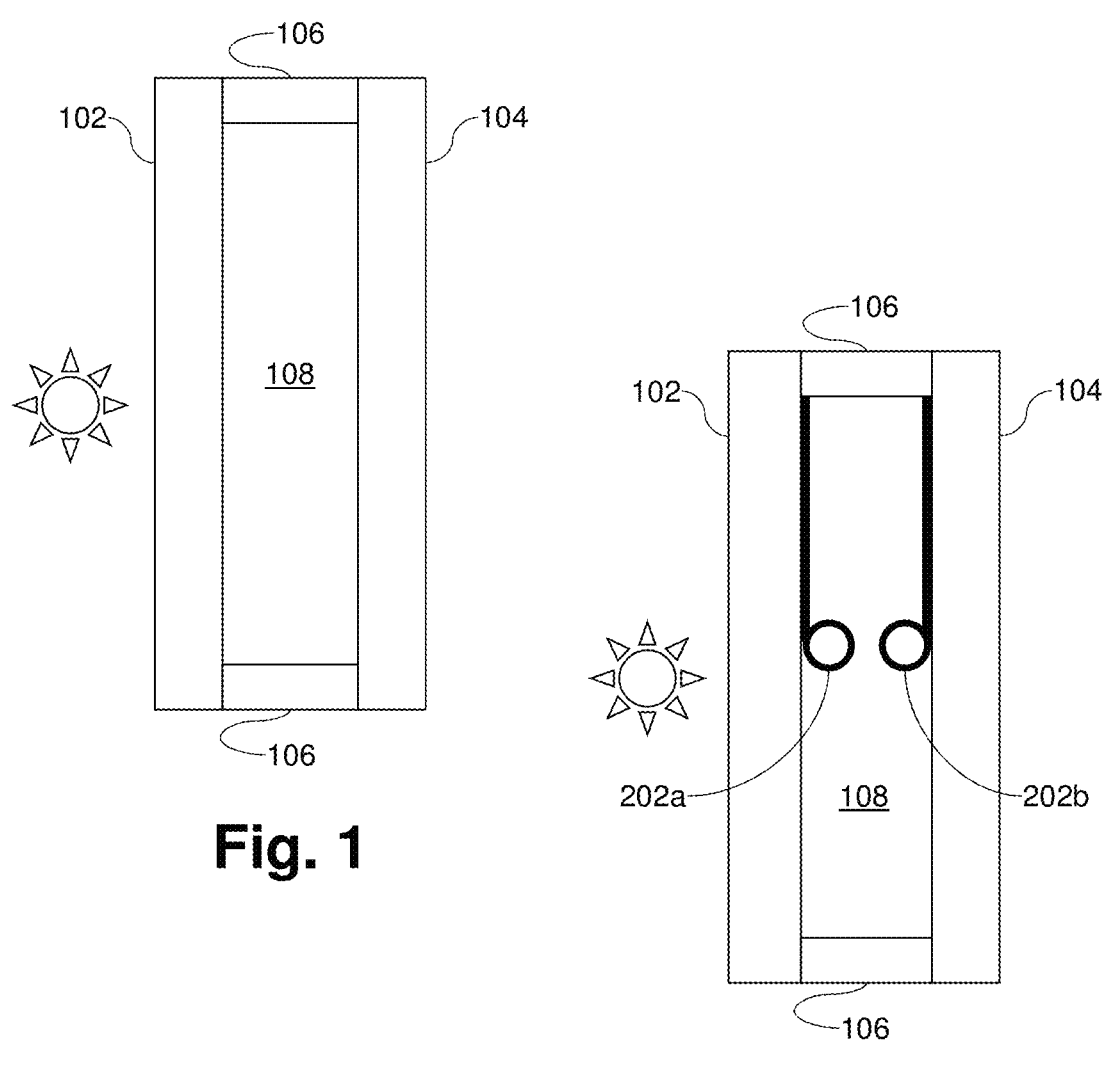
Fig. 1
Fig. 2
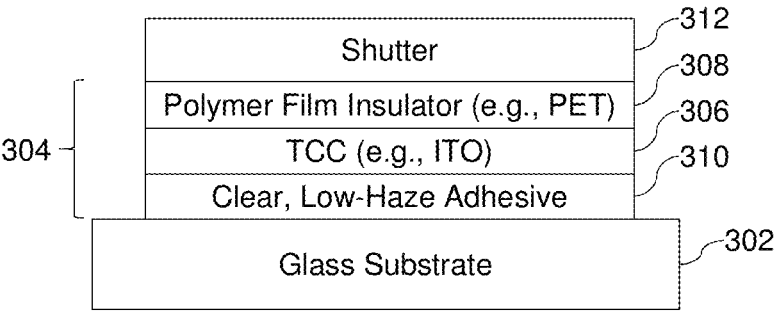
Fig. 3

DYNAMIC SHADE WITH REACTIVE GAS COMPATIBLE DESICCANT, AND/OR ASSOCIATED METHODS

CROSS-REFERENCE TO RELATED APPLICATION

This application claims the benefit of U.S. Application Ser. No. 62/705,776 filed on Jul. 15, 2020, the entire contents of which are hereby incorporated herein by reference.

TECHNICAL FIELD

Certain example embodiments of this invention relate to shades that may be used with insulating glass units (IG units or IGUs), IG units including such shades, and/or methods of making the same. More particularly, certain example embodiments of this invention relate to electric, potentially-driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances. In some example configurations, the spacer system 106 forms an inner or primary seal, whereas the outer seal forms a secondary seal. Windows are unique elements in most buildings in that they have the ability to "supply" energy to the building in the form of winter solar gain and daylight year around. Current window technology, however, often leads to excessive heating costs in winter, excessive cooling costs in summer, and often fails to capture the benefits of daylight, that would allow lights to be dimmed or turned off in much of the nation's commercial stock.

Thin film technology is one promising way of improving window performance Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. The gap is at least partially filled with a reactive gas having an ionization threshold no greater than that of $SF_6$ gas. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate supporting a second conductive layer, the shutter being extendible from a shutter open position to a shutter closed position and being retractable from the shutter closed position to the shutter open position. A control circuit is configured to provide a voltage to create electrostatic forces that drive the flexible substrate to the shutter closed position. A desiccant material comprises a molecular sieve replacement material, the molecular sieve replacement material including a salt, and the desiccant material being compatible with the reactive gas such that the desiccant material fails to trap an appreciable number of molecules therefrom.

According to certain example embodiments, the desiccant material may comprise a desiccant matrix, e.g., which may be polymer-based. In some instances, the desiccant material may lack a molecular sieve.

According to certain example embodiments, the salt may be $MgCl_2$ and/or $CaCl_2$.

According to certain example embodiments, the reactive gas may be $CO_2$ gas.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. The gap is at least partially filled with a reactive gas having an ionization threshold no greater than that of $CO_2$ gas. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate supporting a second conductive layer, the shutter being extendible from a shutter open position to a shutter closed position and being retractable from the shutter closed position to the shutter open position. A control circuit is configured to provide a voltage to create electrostatic forces that drive the flexible substrate to the shutter closed position. A desiccant material comprises a salt, the desiccant material being located in a body of the spacer system.

In certain example embodiments, there is provided a method of making an insulating glass (IG) unit, the method comprising: having first and second substrates, each having interior and exterior major surfaces, the interior major surface of the first substrate facing the interior major surface of the second substrate; and providing a dynamically controllable shade on the first and/or second substrate. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate supporting a second conductive layer, the shutter being extendible from a shutter open position to a shutter closed position and being retractable from the shutter closed position to the shutter open position. The first and second substrates are connected to one another in substantially parallel, spaced apart relation using a spacer system, such that a gap is defined therebetween and such that the dynamically controllable shade is located in the gap. The gap is at least partially filled with a reactive gas having an ionization threshold no greater than that of $SF_6$ gas. A desiccant material is located in a body of the spacer system, the desiccant material including a salt, and the desiccant material being compatible with the reactive gas such that the desiccant material fails to trap an appreciable number of molecules therefrom.

A method of making an IG unit and/or shade (with or without the substrate) in accordance with the techniques described herein, and/or a method of operating such a shade, is/are contemplated herein.

In certain example embodiments, a method of operating a dynamic shade in an insulating glass (IG) unit is provided. The method comprises having an IG unit made in accordance with the techniques disclosed herein; and activating the power source to move the polymer substrate from the shutter open position to the closed position.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a cross-sectional, schematic view of an example insulating glass unit (IG unit or IGU);

FIG. 2 is a cross-sectional, schematic view of an example IGU incorporating electric potentially-driven shades that may be used in connection with certain example embodiments;

FIG. 3 is a cross-sectional view showing example on-glass components from the FIG. 2 example IGU that enable shutter action, in accordance with certain example embodiments;

DETAILED DESCRIPTION

Figure 4:
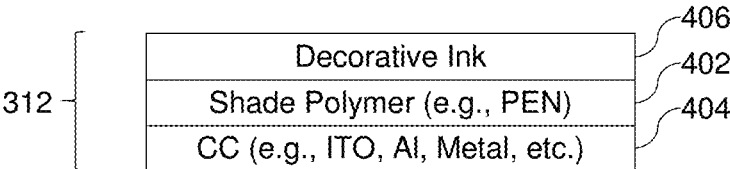
FIG. 4 is a cross-sectional view of an example shutter from the FIG. 2 example IGU, in accordance with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104, respectively. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b electrostatically attract strongly to their respective adjacent substrates 102 and 104.

The shades 202*a* and 202*b* extend along all or a portion of a vertical length of the visible or "framed" area of the substrates 102 and 104 from a retracted configuration to an extended configuration. In the retracted configuration, the shades 202*a* and 202*b* have a first surface area that substantially permits radiation transmission through the framed area. In the extended configuration, the shades 202*a* and 202*b* have a second surface area that substantially controls radiation transmission through the framed area. The shades 202*a* and 202*b* may have a width that extends across all or a portion of the horizontal width of the framed area of the substrates 102 and 104 to which they are attached.

Each of the shades 202*a* and 202*b* is disposed between the first and second substrates 102 and 104, and each preferably is attached at one end to an inner surface thereof (or a dielectric or other layer disposed thereon), near the tops thereof. An adhesive layer may be used in this regard. The shades 202*a* and 202*b* are shown partially rolled out (partially extended) in FIG. 2. The shades 202*a* and 202*b* and any adhesive layer or other mounting structure preferably are hidden from view so that the shades 202*a* and 202*b* are only seen when at least partially rolled out.

The diameter of a fully rolled-up shade may be about 1-15 mm (e.g., 1-5 mm or 6-12 mm) but may be larger or smaller in different example embodiments. Preferably, the diameter of a rolled-up shade is no greater than the width of the gap 108, which is typically about 10-25 mm (with 12-19 mm being typical for IG units in general and with 16-25 mm being typical of some dynamic shade applications), in order to help facilitate rapid and repeated roll-out and roll-up operations. Although two shades 202*a* and 202*b* are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202*a* and 202*b*. The electronic controller may be electrically connected to the shades 202*a* and 202*b*, as well as the substrates 102 and 104, e.g., via suitable leads or the like. The leads may be obscured from view through the assembled IG unit. The electronic controller is configured to provide an output voltage to the shades 202*a* and 202*b* with respect to the conductive layers in substrates 102 and 104, respectively. Output voltage in the range of about 100-650 V DC can be used for driving the shades 202*a* and 202*b* in certain example embodiments. An external AC or DC power supply, a DC battery, and/or the like may be used in this regard. It will be appreciated that higher or lower output voltage may be provided, e.g., depending on the fabrication parameters and materials that comprise the shades 202*a* and 202*b*, the layers on the substrates 102 and 104, etc.

The controller may be coupled to a manual switch, remote (e.g., wireless) control, or other input device, e.g., to indicate whether the shades 202*a* and 202*b* should be retracted or extended. In certain example embodiments, the electronic controller may include a processor operably coupled to a memory storing instructions for receiving and decoding control signals that, in turn, cause voltage to be selectively applied to control the extension and/or retraction of the shades 202*a* and 202*b*. Further instructions may be provided so that other functionality may be realized. For instance, a timer may be provided so that the shades 202*a* and 202*b* can be programmed to extend and retract at user-specified or other times, a temperature sensor may be provided so that the shades 202*a* and 202*b* can be programmed to extend and retract if user-specified indoor and/or outdoor temperatures, preprogrammed or user-specified levels of direct solar incidence are reached, light sensors may be provided so that the shades 202*a* and 202*b* can be programmed to extend and retract based on the amount of light outside of the structure, etc.

Although two shades 202*a* and 202*b* are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc. As another example, a first shade may cover a first part (e.g., top part or left/right part) of a window and a second shade may cover a second part (e.g., a bottom or right/left) of that window. As another example, first, second, and third shades may be provided to cover different approximate one-third portions of a given window.

In certain example embodiments, a locking restraint may be disposed at the bottom of the IGU, e.g., along some or all of its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Example details of the operation of the shades 202*a* and 202*b* will now be provided in connection with FIGS. 3-4. More particularly, FIG. 3 is a cross-sectional view showing example "on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor. In such cases, a dielectric or insulator film is provided, directly or indirectly, on the first conductive layer, with the dielectric or insulator film being separate from the shutter.

It will be appreciated that it is possible to put all of the dielectric layers on the shade in certain example embodiments, thereby exposing a bare conductive (flat) substrate, e.g., a glass substrate supporting a conductive coating. For example, in certain example embodiments, the polymer film insulator 308 may be provided on/integrated as a part of the shutter 312, rather than being provided on/integrated as a part of the substrate 302. That is, the shutter 312 may further support a dielectric or insulator film 308 thereon such that, when the at least one polymer substrate is in the shutter closed position and the shutter is extended, the dielectric or insulator film directly physically contacts the first conductive layer with no other layers therebetween.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethylene terephthalate (PET), polyimide (PI), and polyethylene napthalate (PEN), etc. The dielectric material 308 may have a thickness of 1-30 microns (e.g., 4-25 microns) in certain example embodiments. The thickness of the dielectric material 308 may be selected so as to balance reliability of the shade with the amount of voltage (e.g., as thinner dielectric layers typically reduce reliability, whereas thicker dielectric layers typically require a higher applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the sheet resistance of the conductor 404 may be in the range of 40-200 ohms/square. It will be appreciated that different conductivity values and/or thicknesses (such as, for example, the example thicknesses set forth in the tables below) may be used in different example embodiments.

The decorative ink 406 may include pigments, particles, and/or other materials that selectively reflect and/or absorb desired visible colors and/or infrared radiation. In certain example embodiments, additional decorative ink may be applied to the shutter 312 on a side of the conductor 404 opposite the resilient layer 402.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or electrical charge or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade helps selectively reflect or absorb certain visible colors and/or infrared radiation by being interposed in the light path through the IG unit. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. Other inks may of course be used in different example embodiments. A PEN material commercially available from DuPont that is 6, 12, or 25 microns thick may be used as the resilient layer 402. Other materials may of course be used in different example embodiments. For an opaque conductor, evaporated Al that has a nominal thickness of 375 nm may be used. For a transparent option, sputtered ITO may be used. In both cases, the sheet resistance may be 100-400 ohms/square. (If aluminum is used, the sheet resistance may be lower than 100 ohms/square; in certain example embodiments, it even may be less than 1 ohm/square.) The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's vaporization temperature (or melting temperature) to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/ strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

| | | PEN | PEEK | PI |
|---|---|---|---|---|
| 25 degrees C. | UTS (psi) | 39,000 | 16,000 | 33,500 |
| | Modulus (psi) | 880,000 | 520,000 | 370,000 |
| | Yield (psi) | 17,500 | | 10,000 |
| 200 degrees C. | UTS (psi) | 13,000 | 8,000 | 20,000 |
| | Modulus (psi) | | | 290,000 |
| | Yield (psi) | <1,000 | | 6,000 |
| Tg | | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10^{-6}$/k for Al down to $4.8 \times 10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Figure 5:
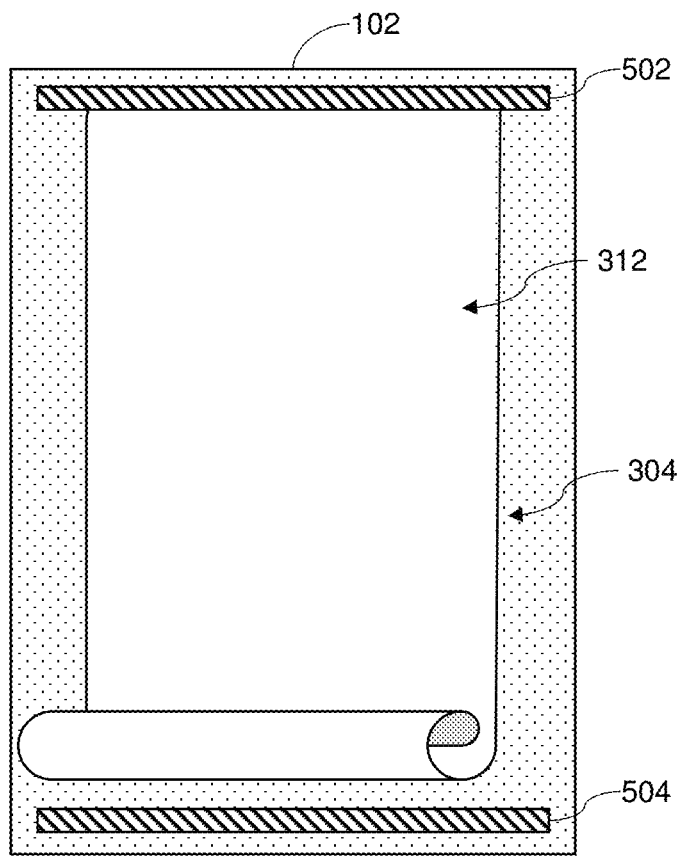
FIG. 5 is a plan view of a substrate incorporating on-glass components from the FIG. 3 example and shutter components from the FIG. 4 example, in accordance with certain example embodiments.

FIG. 5 is a plan view of a substrate 102 incorporating on-glass components 304 from the FIG. 3 example and shutter components 312 from the FIG. 4 example, in accordance with certain example embodiments. The shutter 312 extends from the anchor bar 502 toward the stop 504 when moving to the shutter closed position. The shutter retracts from the stop 504 towards the anchor bar 502 when moving to the shutter open position.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 10,876,349; 8,982,441; 8,736,938; 8,134,112; 8,035,075; 7,705,826; and 7,645,977, as well as U.S. application Ser. No. 17/232,406 filed on Apr. 16, 2021; the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

As noted above, IG units sometimes use a spacer system as at least a part of an inner or primary seal while an outer seal helps form a secondary seal. In this regard, see FIG. 6, which is an enlarged cross-section view of an end portion of the FIG. 2 example IG unit, in accordance with certain example embodiments. The spacer system 106 forms a generally rectangular frame around the IG unit. The FIG. 6 cross-sectional view shows the spacer system being bonded or otherwise adhered to the inner surfaces of the first and second substrates 102 and 104 using materials 602a and 602b. The outer seal 604 is provided external to the spacer system 106, remote from the gap 108. The spacer system

106 and the outer seal 604 function together, forming a sealant system that helps keep moisture out of the gap 108 and helps keep fill gas in the cavity 108. This seal helps prolong the life of the IG unit, keeping it aesthetically pleasing by virtue of the reduction of the ingress of moisture (which otherwise could cause the IG unit to fog up, appear cloudy, etc.).

There are a number of different possible spacer systems that can be used in different example embodiments. One example uses two metal sheets separated by nylon legs to form a generally rectangular frame with a cavity. This general configuration is used in Guardian IG spacers, for example. See, for example, U.S. Pat. Nos. 8,795,568; 8,967,219; 9,187,949; 9,309,714; 9,617,781; 9,656,356; 9,689,196; and 10,233,690, which set forth example spacer formation and application techniques. The entire contents of each of these patents is hereby incorporated herein by reference.

Figure 6:
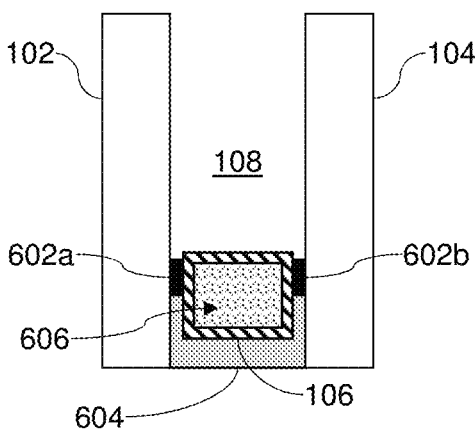
FIG. 6 is an enlarged cross-section view of an end portion of the FIG. 2 example IG unit, in accordance with certain example embodiments.

As shown in the FIG. 6 example, the spacer system 106 is at least partially filled with a desiccant 606. In one example, the desiccant 606 is provided in the spacer system 106, which has a limited space (e.g., about 4.5 mm×2.5 mm in a common configuration). The desiccant 606 typically will be extruded into this space. However, different approaches of providing the desiccant material may be used in different instances. Typically, loose fill powder and/or bead desiccant materials, and materials that agglomerate out to such materials, will not be used. This is because typical downstream processing makes it likely that desiccant material will escape from the spacer system 106 and impart a visual obstruction within the air cavity of the IG unit.

The desiccant 606 adsorbs moisture over the life of the IG unit, which typically is more than 20 or 25 years. Once the desiccant 606 is fully saturated, the inner cavity moisture vapor pressure rises, and water can condense on the inner surface, stain the glass, and render the IG defective (or at least aesthetically displeasing). In a sense, one of the main functions of the IG unit, namely, being able to see through it clearly, is compromised.

Thus, it will be appreciated that it would be desirable to provide desiccant materials in connection with IG units. By design, a desiccant helps address the small vapor transmission directly through the seals in a well-designed and built IG unit, as all seal materials generally have real-world permeation rates. Doing so can, for example, help prolong the effective life of the IG units by virtue of helping to compensate for poor or failing (and perhaps sometimes failed) seals, while also helping to maintain solar performance and aesthetics, and potentially enabling different gasses to be used inside of the IG units, etc. One aspect of certain example embodiments relates to a non-rigid high moisture adsorption capacity desiccant material with fast draw down capability.

HL-5157, commercially available from H.B. Fuller, is a butyl matrix desiccant with a molecular sieve blended into it. This product allows for about 12.5% of moisture uptake by weight. The butyl component limits moisture diffusion to inner particles of desiccant (the molecular sieve). Other commercial desiccant matrix formulations may provide about 14.5% by weight moisture capacity. With respect to the HL-5157 product, it has been found that increasing the molecular sieve to try and improve desiccant capacity results in changes of the material properties and makes it hard to extrude, while also changing the properties of the matrix once cool.

The conventional thinking is that a much higher capacity desiccant material (e.g., greater than 15% by weight, more preferably greater than 50% by weight, and approaching or even surpassing 100% by weight) would be desirable in that it could lead to lower material cost, reduced desiccant material volume, adequate capacity during a 20-25-year (or possibly longer) lifetime, and enhanced post-production dew point reduction in IG units. Thus, according to the conventional wisdom, it would be desirable to improve upon current desiccant materials such that new materials are provided, e.g., with a maximum capacity that is about 2-5 times higher than what is currently being employed. Further, as the inventors have recognized, it would be desirable to have high-efficiency desiccant materials that can be either extruded or held together in some way, e.g., so that they can be used in connection with a variety of different spacer systems and/or configurations including, for example, in the body of box-type spacer systems such as those described above. Desiccant beads and molecular sieves alone might be considered ideal and have minimal diffusion issues (at least when this conventional wisdom is applied), but the materials might be disadvantageous because they could break loose or dislodge during manufacturing (e.g., when the spacer system frame is cut) unless an additional remediation technique is employed (which could involve, for example, using a coating to keep the desiccant material together, without adversely affective diffusive effects).

In general, it would be desirable to have a desiccant material that captures water molecules and avoids bigger atoms and molecule capture. Oxygen, argon, and nitrogen capture, for example, can be problematic, e.g., because that might involve capture of the desired environment within the cavity of the IG unit (e.g., capture of atoms contributing to the 80% Ar-20% air or 90% Ar-10% air environments that are typical for IG units, or the capture of capture of atoms of the inert gas that partially or completely fills the cavity of the IG unit). If these materials are captured, the desiccant can essentially liquefy, creating aesthetic and functional problems for the IG unit.

These problems can become even more severe in the context of dynamic shade applications, however, as reactive gasses such as $SF_6$, $CO_2$, and/or the like are used in place of (or in addition to) inert gas environments. $CO_2$ and other reactive gasses are helpful in some electrical applications including dynamic shade applications because they essentially insulate against electrical arcing. $SF_6$ gas helps stay below the ionization threshold and has been used in dynamic shade applications. $CO_2$ may be advantageous compared to $SF_6$ in some instances because $CO_2$ still has a fairly high ionization threshold, is readily available, is low cost, and provides good insulation/a good U-value which potentially enables the IG units to be used for a variety of different applications including for exterior window applications. But excess take-up of molecules from reactive gasses inside of IG unit cavities where dynamic shades are disposed can be particularly problematic because of the creation of liquid and possibly even an increased potential for arcing. In any event, the take-up of IG unit atmosphere into the desiccant causes the pressure in the IG unit pressure cavity drops, and the IG unit can visibly collapse. And even if it does not collapse, the lower pressure can create higher driving forces for seal diffusion. With $CO_2$ for example, collapse can occurs quite quickly. Moreover, as discussed in greater detail below, molecular sieves in particular are known to be problematic when reactive gasses are used (e.g., $CO_2$ capture is a known issue for molecular sieves). Thus, certain example embodiments related to a desiccant material that is compatible with reactive gasses such as, for example, $SF_6$, $CO_2$, and/or the like.

A 3 A molecular sieve material will have a pore diameter of 3 angstroms and a bulk density, whereas a 13× molecular sieve material will have a pore diameter of 10 angstroms. A material with a nominal pore opening of 3 angstroms, or a blend with a high proportion of 3 A material and a low proportion of 13× material, might be desirable if conventional wisdom were being applied. Moisture adsorption by weight of at least 20%, more preferably at least 50%, and still more preferably at least 75%, similarly might be desirable if conventional wisdom were being applied. There preferably would be no outgassing of any volatile compounds (e.g., volatile organic compounds) below 70 degrees C. Other desirable properties might include, for example:

A non-rigid profile capable of bending profile to 12" diameter with little force;

Extrudable, injectable, or otherwise locatable in the cavity of a continuous linear box spacer system assembly as the box spacer system is manufactured (e.g., such that it maintains its shape with little or no slump at extrusion temperatures, has a small profile, and can be placed within cavities of the sizes noted above);

Not friable for at least one year, such that dust, particles, beads, and/or small pieces do not easily flake or break loose from bulk extrusion;

Cuttable, sliceable, or susceptible to punch-out at room temperature with tool steel hardware or the like;

No appreciable moisture diffusion limitation;

Active for 20-25+ years;

Able to withstand long term −50 degree C. to +70 degree C. temperature cycling without degradation or any other side effects;

Low cost; and/or

Lacking in harmful and/or regulated components, e.g., such that the material is useable in common manufacturing areas of production facility with no special personal protective equipment, air handling requirements, or the like.

Different categories of materials may be used to provide desiccants that behave as desired. These categories include, for example, alternative desiccant materials, hybrid desiccant materials, and polymer-based desiccants/binders. Each is discussed, in turn, below.

First, alternative desiccant materials basically comprise primary desiccant materials that are physically and/or chemically modified to have improved moisture adsorption properties. Typically, these materials will be in homogeneous powders or particles. Modified $MgSO_4$, for example, may be used in this regard. Modified $MgSO_4$, for example, may be used in this regard. Modifications may include, for example, modifying particle size (e.g., in the case of $MgCl_2$), dehydrating materials for use, and/or the like.

Second, hybrid desiccant materials basically are composite materials that include a primary desiccant material with other materials such as binders or clay to improve the overall properties of the composite for specific purposes. Suitable hybrid materials may be achieved by combining calcium chloride or metal oxide compounds which are able to absorb high amount of moisture with binders or clay to support and retain the desiccant materials when they are turned to liquid after the moisture adsorption.

Third, the polymer-based desiccants/binders category refers to any polymer-based material that can be used either as a desiccant by itself, or act as a binder for any other desiccant material. Moldable polymer based desiccants or at least binders that improve the desiccant properties may be used in this regard.

The addition of salts or other common materials to a standard desiccant matrix material, has been found to yield improved (higher) moisture capacity, which may be beneficial for IG units, especially IG units that include dynamic shades such as those described herein. These materials may be added in addition to, or take the place of, standard molecular sieves in certain example embodiments. Materials that may be used in this regard include salts and other materials such as, for example, $MgCl_2$, $CaCl_2$, $CaO$, $MgSO_4$, and/or the like. $CO_2$ and some other reactive gasses are not compatible with molecular sieves so, in such cases, desiccant materials may completely lack molecular sieve materials.

Figure 7:
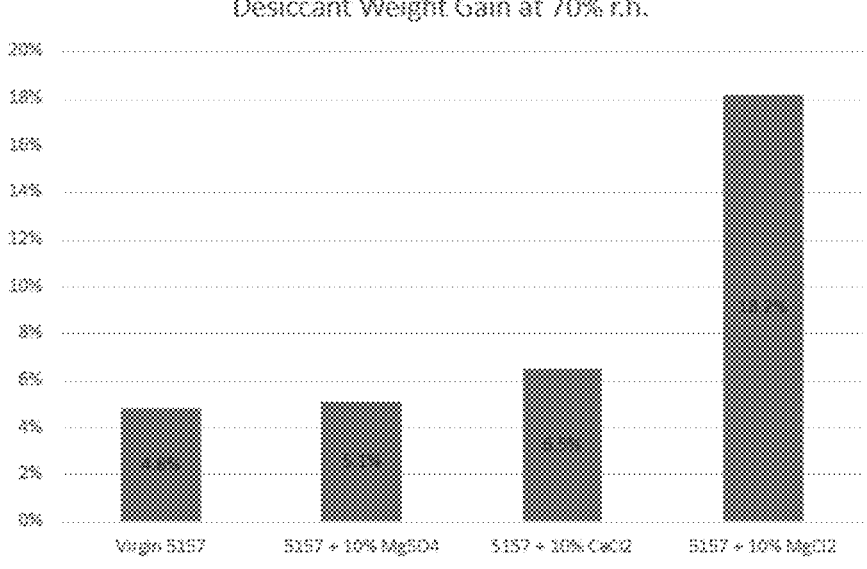
FIG. 7 is a graph showing desiccant weight gain for different combinations of materials at 70% relative humidity.

FIG. 7 is a graph showing desiccant weight gain for different combinations of materials at 70% relative humidity. The "+10%" label in FIG. 7 indicates that x grams of HL-5157 material had 0.1x grams of the other listed material added to it. As can be seen from FIG. 7, at 70% relative humidity, HL-5157 from H.B. Fuller had a "baseline" weight gain of 4.8%. The introduction of an added 10% $MgSO_4$ provided a modest increase to 5.1% by weight and, likewise, the introduction of an added 10% $CaCl_2$ provided an increase to 6.5% by weight. In contrast, the introduction of an added 10% $MgCl_2$ provided a superior result, namely, an increase to 18.2% by weight.

In the IG unit space, the conventional thinking is that reaching saturation of desiccant will cause the air around the desiccant to saturate as well (or at the very least be at equilibrium with saturation of the particular material), and saturated air implies condensing or at the edge of condensing at a given temperature. Thus, when focusing on performance at high humidity values, one would rule-out or discount solutions making use of conventional desiccant matrix materials with added salts or other materials such as those listed above. Moreover, standard IG unit desiccants claim moisture capacities at relative humidity values substantially greater than the conditions typically found within IG units. This artificially raises the perceived moisture capacity and can exclude other potential materials for consideration as use in desiccant materials, e.g., for complementing a desiccant matrix and/or for at least partially replacing an existing molecular sieve. Indeed, prior work has ruled out solutions including $MgCl_2$, for example, even though it did increase the capacity of the base desiccant matrix, because liquid water could develop, which would undermine the point of its inclusion.

The inventors have recognized, however, that failure typically starts at 15-20% relative humidity in an insulating glass unit. Thus, gauging failure at high humidity levels (like the 70% relative humidity value used in FIG. 7) and setting targets for 75% or more are not really relevant to typical use cases. In this sense, gauging failures at 60% relative humidity might make sense in the packaging and other contexts, but testing at a much lower relative humidity would produce results at a much more realistic level suitable for IG unit applications, including dynamic shade applications. At lower relative humidity values, however, different materials behave differently. Thus, it is possible to attain desirable performance with a different spectrum of materials in certain example embodiments.

The inventors have further recognized that testing in an environment with 10-20% relative humidity, more preferably 10-15% relative humidity would yield data most relevant to typical IG unit applications. In certain example embodiments, an environment created by a LiCl and/or KOH salt solution may be used when blending and/or testing desiccant matrix and sieve replacement materials. Doing so creates a humidity of 11% (which accords with the European EN 1279 series specifications), which is similar to the relative humidity level observed at the end of life of a typical IG unit. It therefore may serve as an appropriate test in some instances. It will be appreciated that other salt solutions or the like may be used to create mixing and/or testing environments that may be used in connection with certain example embodiments. With this lower relative humidity environment, which in some ways is more appropriate for (or better tailored to) IG unit applications, concerns with development of liquid water at very high adsorption should be mitigated. It will be appreciated that the desiccant material, in whole or in part, can be formed and/or tested in an environment at a relative humidity of 10-20% in some instances. In other instances, the desiccant material, in whole or in part, can be formed and/or tested in an environment at higher and/or lower relative humidity ranges. Moreover, even though the desiccant material, in whole or in part, can be formed and/or tested in such relative humidity ranges, it will be appreciated that the absorption may occur over much broader ranges of relative humidity in use.

Certain example embodiments thus provide a desiccant material comprising a desiccant matrix and a molecular sieve replacement material (e.g., $MgCl_2$, $CaCl_2$, $CaO$, $MgSO_4$, and/or the like) formed for adsorption at a relative humidity of 10-20%. This desiccant material may further comprise a molecular sieve different from the molecular sieve replacement material, or the molecular sieve replacement material may completely replace any other molecular sieve. In certain example embodiments, the molecular sieve replacement material may comprise 5-25% of the desiccant material, more preferably 10-20% of the desiccant material. The remainder of the material may be the desiccant matrix material in certain example embodiments. In certain example embodiments, the molecular sieve replacement material may amount to 5-25% of the other desiccant material, more preferably 10-20% of the desiccant material. The desiccant matrix material may be HL-5157 or some other existing material in certain example embodiments.

In certain example embodiments, some or all of the design goals as noted above may be used with the desiccant material designed for use with lower relative humidity values. For example, such a desiccant material may be blended into a paste or other material that can be injected, extruded, or otherwise easily provided in an IG unit spacer system (e.g., as the spacer system is being formed and/or as the substrates are being connected to one another). The desiccant material may be provided in a body of the spacer system, and the spacer system may be any of the spacer systems described in the patent publications listed above. As another example, there preferably would be no outgassing of any volatile compounds (e.g., volatile organic compounds) below 70 degrees C. Other desirable properties might include, for example, the material being not friable for at least one year, such that dust, particles, beads, and/or small pieces do not easily flake or break loose from bulk extrusion; being active for 20-25+ years; etc.

Including a matrix material in a desiccant does slow the adsorption rate of the desiccant. This is sometimes thought of as a negative effect in accelerated testing, as forced diffusion of water into the system may outpace the matrix until it is given enough recovery time to catch up. However, the inventors have realized that real-world diffusion is relatively slow, so this concern is alleviated. Moreover, the slow property of the matrix can be a positive for manufacturing process, as sensitivity to open time during processing is reduced and/or the amount of open time can be increased.

The use of salts or other common materials, such as $MgCl_2$, together with or in place of standard molecular sieves, will enable alternate, typically reactive gases such as $CO_2$, to be used IG units as well, without causing the IG units' volumetric decrease. Indeed, common materials, such as $MgCl_2$, do not react with $CO_2$. Thus, the use of such materials opens the pathway to using reactive gasses within IG unit cavities. As noted above, $CO_2$ and some other reactive gasses are not compatible with molecular sieves so, in such cases, desiccant materials may lack molecular sieve materials altogether. Furthermore, shade applications are particularly sensitive to contamination from even very small particles. Indeed, it has been found that the presence of particles of about 5 microns in major dimension in IG unit cavities can inhibit shade operations. Thus, fully capturing materials and, accordingly desiccant material selection, may be particularly important in such applications. Certain example embodiments aim to capture particles having a diameter or major dimension of at least 10 microns, more preferably at least 8 microns, and still more preferably at least 5 microns. However, the desiccant material preferably are compatible with the reactive gas such that the desiccant material fails to trap an appreciable number of molecules therefrom.

The ability to provide a reactive gas such as $CO_2$ may be useful for providing electronic components in the cavity of the IG unit, e.g., because the $CO_2$ or other reactive gas may enable advantageous electrical properties to be realized. That is, as discussed above, $CO_2$ and other reactive gasses are helpful in some electrical applications because they essentially insulate against electrical arcing. And although $SF_6$ gas helps stay below the ionization threshold and has been used in dynamic shade applications, $CO_2$ may be advantageous compared to $SF_6$ in some instances because $CO_2$ still has a fairly high ionization threshold, is readily available, is low cost, and provides good insulation/a good U-value which potentially enables the IG units to be used for a variety of different applications including for exterior window applications. Electrically-powered components that may be included in the cavity include, for example, lighting elements such as LEDs or the like, Internet-of-Things (IoT) devices such as sensors and the like, etc. These components may be provided in addition to electrostatically- and/or motor-driven dynamic shades, etc. In certain example embodiments, the cavity may be filled with up to 80%, up to 90%, or even up to 100%, with a reactive gas such as $CO_2$.

It will be appreciated that the use of a desiccant matrix versus loose beads advantageously will reduce the likelihood of dust being produced within the IG unit cavity, which otherwise could be detrimental to functionality of an electronic device (and especially a dynamic shade). Certain example embodiments include a spacer housing a desiccant material including a desiccant matrix. However, different example embodiments may be provided in which a desiccant material lacking a desiccant matrix is provided in a spacer. Moreover, desiccant material with or without a matrix may be provided external to a spacer system in certain example embodiments. In this sense, a desiccant matrix is optional in different example embodiments, and there may be different ways to bind together desiccant material without the use of a matrix. For instance, desiccant can be provided as trapped beads in box spacers to be embedded in the foam formulation of foam spacers in certain example embodiments.

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate. Desiccant materials may be provided for one or both spacer systems in such arrangements.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:

first and second substrates, each having interior and exterior major surfaces, the interior major surface of the first substrate facing the interior major surface of the second substrate;

a spacer system helping to maintain the first and second substrates in substantially parallel spaced apart relation to one another and to define a gap therebetween, wherein the gap is at least partially filled with a gas selected from the group consisting of $SF_6$, $CO_2$, and combinations thereof;

a dynamically controllable shade interposed between the first and second substrates, the shade including:

a first conductive layer provided, directly or indirectly, on the interior major surface of the first substrate;

a first dielectric layer provided, directly or indirectly, on the first conductive layer on a side thereof opposite the first substrate; and a shutter including a flexible substrate supporting a second conductive layer, the shutter being extendible from a shutter open position to a shutter closed position and being retractable from the shutter closed position to the shutter open position;

a control circuit configured to provide a voltage to create electrostatic forces that drive the flexible substrate to the shutter closed position; and a desiccant material comprising a molecular sieve replacement material and lacks a molecular sieve, the molecular sieve replacement material including a salt, the salt comprising $MgCl_2$, and the desiccant material being compatible with the gas such that the desiccant material fails to trap an appreciable number of molecules of the gas.

2. The IG unit of claim 1, wherein the desiccant material comprises a desiccant matrix.

3. The IG unit of claim 2, wherein the desiccant matrix is polymer-based.

4. The IG unit of claim 1, wherein the salt further comprises $CaCl_2$.

5. The IG unit of claim 1, wherein the gas is $CO_2$ gas.

6. The IG unit of claim 1, wherein the desiccant material formed for adsorption at a relative humidity of 10-20%.

7. The IG unit of claim 1, wherein the desiccant material is located in a body of the spacer system.

8. A method of making an insulating glass (IG) unit, the method comprising:

having first and second substrates, each having interior and exterior major surfaces, the interior major surface of the first substrate facing the interior major surface of the second substrate;

providing a dynamically controllable shade on the first and/or second substrate, the shade including:

a first conductive layer provided, directly or indirectly, on the interior major surface of the first substrate;

a first dielectric layer provided, directly or indirectly, on the first conductive layer on a side thereof opposite the first substrate; and a shutter including a flexible substrate supporting a second conductive layer, the shutter being extendible from a shutter open position to a shutter closed position and being retractable from the shutter closed position to the shutter open position; and connecting the first and second substrates to one another in substantially parallel, spaced apart relation using a spacer system, such that a gap is defined therebetween and such that the dynamically controllable shade is located in the gap, wherein the gap is at least partially filled with a gas selected from the group consisting of $SF_6$, $CO_2$, and combinations thereof, wherein a desiccant material is located in a body of the spacer system, the desiccant material comprising a molecular sieve replacement material and lacks a molecular sieve, the molecular sieve replacement material including a salt, the salt comprising $MgCl_2$, and the desiccant material being compatible with the gas such that the desiccant material fails to trap an appreciable number of molecules of the gas.

9. The method of claim 8, wherein the desiccant material comprises a desiccant matrix.

10. The method of claim 8, wherein the salt further comprises $CaCl_2$.

11. The method of claim 8, wherein the gas is $CO_2$ gas.

12. A method of operating a dynamic shade in an insulating glass (IG) unit, the method comprising:

having the IG unit of claim 1; and activating the power source to move the polymer substrate from the shutter open position to the closed position.

* * * * *